United States Patent [19]

Hosonuma et al.

[11] Patent Number: 4,643,529
[45] Date of Patent: Feb. 17, 1987

[54] POLARIZING FILM

[75] Inventors: Sin Hosonuma; Junichi Fujio, both of Nagoya; Kozo Tanaka, Yokohama; Harue Suzuki, Tokyo; Kenichi Baba, Yokohama, all of Japan

[73] Assignee: Mitsui Toatsu Chemicals, Incorporated, Tokyo, Japan

[21] Appl. No.: 684,136

[22] Filed: Dec. 20, 1984

[30] Foreign Application Priority Data

Dec. 23, 1983 [JP] Japan ............................ 58-242153

[51] Int. Cl.$^4$ ............................................. G02F 1/13
[52] U.S. Cl. .................................. 350/337; 350/398
[58] Field of Search ........................................ 350/337

[56] References Cited

U.S. PATENT DOCUMENTS

| 4,193,287 | 3/1980 | Pfeiffer | 350/337 X |
|---|---|---|---|
| 4,217,160 | 8/1980 | Perregaux | 350/337 X |
| 4,229,498 | 10/1980 | Suzuki et al. | 350/337 X |
| 4,387,133 | 6/1983 | Ichikawa et al. | 350/337 X |
| 4,533,214 | 8/1985 | Penz et al. | 350/337 X |
| 4,552,436 | 11/1985 | Kozaki et al. | 350/337 |
| 4,586,790 | 5/1986 | Umeda et al. | 350/337 |

FOREIGN PATENT DOCUMENTS

| 0089493 | 9/1983 | European Pat. Off. | 350/337 |
|---|---|---|---|
| 55-45037 | 3/1980 | Japan | 350/337 |
| 56-32101 | 4/1981 | Japan | 350/337 |

Primary Examiner—John K. Corbin
Assistant Examiner—Richard F. Gallivan
Attorney, Agent, or Firm—Fisher, Christen & Sabol

[57] ABSTRACT

Disclosed is a polarizing film containing a base resin and a photodichroic material which is characterized in that (1) the uniaxial orientation coefficient (f) of the principal crystal axis which is a crystal axis parallel to the molecular chain of the base resin, with respect to the reference axis is not less than 0.7 and (2) when a specimen of the polarizing film is cut out so as to have a surface perpendicular to the reference axis and X-rays impinging on the specimen parallel to the reference axis, the product (f×R) of the aforesaid uniaxial orientation coefficient (f) and the proportion (R=($I_{min}/I_{max}$)×100) of the minimum value ($I_{min}$) to the maximum value ($I_{max}$) of diffracted X-ray intensity on the resulting Debye-Scherrer ring is not less than 10. This polarizing film has excellent thermal resistance and moisture resistance and gives a high degree of polarization.

4 Claims, No Drawings

POLARIZING FILM

BACKGROUND OF THE INVENTION

1. Field of the Invention

This invention relates to polarizing films containing a photodichroic material.

In recent years, polarizing films are being widely used as an element of liquid-crystal display devices for, for example, electronic computers and watches or as glare shields applied to, for example, glass. However, the development of the electronics industry has enlarged the field of application of liquid-crystal display devices, leading to a demand for improved performance of liquid crystals per se. As a result, it has also come to be required that polarizing films used in combination with liquid crystals should attain an improved degree of polarization, exhibit optical uniformity, and have excellent thermal resistance and moisture resistance.

2. Description of the Prior Art

Conventionally, polarizing films comprising polyvinyl alcohol (PVA) and iodine are commonly used because of their good polarizing properties. However, polarizing films of the PVA-iodine type have the disadvantage of being insufficient in moisture resistance and thermal resistance. Accordingly, durable polarizing films comprising a thermoplastic resin and a photodichroic material are now being developed.

Nevertheless, polarizing films comprising a thermoplastic resin and a photodichroic material fail to exhibit satisfactorily high polarizing power and, therefore, have not yet been put to practical use.

There are two well-known methods of making polarizing films containing a photodichroic material. One method involves impregnating a uniaxially oriented film of base resin with a photodichroic material such as iodine or a photodichroic dye, while the other involves uniaxially orienting a film of base resin containing a photodichroic material. In either of these methods, the base resin is uniaxially oriented to arrange its molecules in one direction and the photodichroic material is oriented on the basis of the orientation of the base resin to manifest its polarizing power. Accordingly, it is believed that there is a close relationship between the state of orientation of the base resin and the polarizing power of the film. Usually, the state of orientation of a resin is evaluated by determining its uniaxial orientation coefficient (f), and greater values for f indicate higher degree of orientation. Thus, it is presumed that the polarizing power of a film is enhanced as its degree of orientation becomes higher.

However, in the course of research in polarizing films using a hydrophobic base resin and containing a photodichroic material, the present inventors have found a phenomenon which cannot necessarily be accounted for by the above-described principle. More specifically, it has been found that, in order to obtain a film having good polarizing power, the film must have not only a high uniaxial orientation coefficient (f) as determined by the X-ray diffraction method, but also good uniformity of diffraction intensity on the Debye-Scherrer ring produced by the X-rays imping parallel to the reference axis on the specimen which is cut out perpendicular to the reference axis of the film. (The reference axis will be described later.)

SUMMARY OF THE INVENTION

It is an object of the present invention to provide a novel polarizing film having excellent thermal resistance and moisture resistance and giving a high degree of polarization.

According to the present invention, there is provided a polarizing film containing a base resin and a photodichroic material which is characterized in that (1) the uniaxial orientation coefficient (f) of the principal crystal axis of the base resin with respect to the reference axis is not less than 0.7, the reference axis being defined, when the imping X-rays are perpendicular to the surface on the polarizing film, as an axis which is in the plane of the polarizing film and which makes an angle of 90° with the axis made by normal prejection of the direction of the strongest X-rays in the Debye-Scherrer ring diffracted by crystal planes parallel to the principal crystal axis of the base resin on the polarizing film; and (2) when a specimen of the polarizing film is cut out so as to have a surface perpendicular to the reference axis and X-rays impinging on the specimen parallel to the reference axis, the product ($f \times R$) of the aforesaid uniaxial orientation coefficient (f) and the ratio ($R = (I_{min}/I_{max}) \times 100$) of the minimum value ($I_{min}$) to the maximum value ($I_{max}$) of diffracted X-ray intensity on the resulting Debye-Scherrer ring is not less than 10.

DETAILED DESCRIPTION OF THE PREFERRED EMBODIMENTS

As the base resin used in the present invention, there may desirably be used resins which can be made into transparent films and which can be oriented. Among others, hydrophobic thermoplastic resins are preferred. Examples of such preferred thermoplastic resins include polyamides, polyolefins, polyesters, polyvinyl halides, polystyrene, polycarbonates, polyacrylates, polysulfones, polyethers, and ethylene-vinyl alcohol copolymers. Among these resins, polyolefins, polyamides, and polyesters are particularly preferred.

Generally, photodichroic materials are materials having anisotropy in light absorption properties. The photodichroic material used in the present invention can be selected from among dyes and organic pigments which are known to exhibit photodichroism, and useful dyes include direct dyes and disperse dyes (as disclosed, for example, in Japanese Patent Laid-Open No. 106743/'78 and Japanese Patent Publication No. 3944/'74). Among others, organic coloring materials which can be dispersed or dissolved in the aforesaid thermoplastic resins or can impart color thereto are preferred. The amount of photodichroic material used may vary according to the desired degree of coloring of the polarizing film. However, the photodichroic material is usually used in an amount of 0.003 to 3% by weight, preferably 0.01 to 1% by weight, based on the weight of the base resin.

In one embodiment, the polarizing film of the present invention can be made by forming a film from a base resin optionally containing stabilizers, ultraviolet light absorbents, lubricants, and surface active agents according to a well-known method such as melt extrusion, calendering, or solvent casting, orienting the film and then impregnating the film with a photodichroic material. In another embodiment, a photodichroic material may be included in the base resin prior to orientation.

Specifically, a film formed as above but not yet oriented is impregnated with a photodichroic material, for example, by soaking it in a solution of the photodichroic material, and the film is then oriented. Alternatively, a base resin is mixed (e.g., by dry blending, or solution mixing) with a photodichroic material selected with due consideration for its compatibility with, for example, the base resin, and dyeing properties; the resulting mixture is formed into a film; and the film is then oriented. The film should be oriented at a temperature between the melting point and glass transition point of the base resin.

The orientation may be carried out according to any of various techniques including stretching techniques such as roll stretching, bath stretching, hot plate stretching, or tentering, and rolling techniques such as roll orientation. However, it is necessary to orient the film so as to prevent it from being significantly oriented in any direction other than that of the orientation axis, and the polarizing film of the present invention cannot be obtained unless a technique meeting this requirement is used. In order to prevent the film from being oriented in any direction other than that of the orientation axis, for example, roll orientation should be carried out under such conditions that transverse shrinkage resulting from the rolling will occur as readily as possible. Where the film is transversely stretched by tentering, this should be carried out while allowing the film to shrink by a ratio equal to the square root of the stretch ratio. Of course, the polarizing film of the present invention can be made according to any other technique that can bring the film into the above-described specific state of orientation.

After being oriented as above, the film is fixed, if desired, by heating it over a heating roll, in a hot-air oven or with an infrared heater. Thus, there is obtained a polarizing film in accordance with the present invention.

The X-ray diffraction method for characterizing the polarizing film of the present invention will now be described hereinbelow.

(1) Determination of the reference axis

A polarizing film was attached to the fiber sample mount of a X-ray diffractometer [Model SG-1; manufactured by Rigaku Denki K.K.] and its X-ray diffraction spectrum was recorded under the following conditions:

X-ray source: Cu-Kα (Ni filter).
Applied voltage: 35 kV.
Applied current: 20 mA.
Slit system: Pinhole slit (3 mm in diameter) —vertical slit (2° )—horizontal slit (2° )
Diffraction angle: Adjusted to the diffraction angle of an arbitrarily selected crystal plane parallel to the principal crystal axis which is parallel to the molecular chain of the base resin.

Background and non-crystal peaks were separated from the X-ray diffraction spectrum thus recorded. Then, the reference axis was defined as an axis forming an azimuth angle of 90° with the direction giving a maximum crystal peak intensity.

(2) Measurement and calculation of uniaxial orientation coefficient (f)

A cylindrical specimen of about 1 mm diameter having the reference axis as its longitudinal axis was prepared. This specimen was attached to the fiber sample mount and its X-ray diffraction spectrum was recorded.

Crystal peaks were separated from the X-ray diffraction spectrum thus recorded. The mean square cosine ($<\cos^2 \phi>$) of the principal crystal axis with respect to the reference axis were determined and the value for f was calculated according to the following equation:

$$f = \tfrac{1}{2} \times (3 \times <\cos^2 \phi> - 1)$$

where $\phi$ was the angle which the principal crystal axis of the base resin formed with the reference axis.

(3) Measurement and calculation of the ratio ($R = I_{min}/I_{max} \times 100$) of diffracted X-ray intensity A polarizing film was cut into ribbons of 1 mm width and 20 mm length in such a way that the direction of the width was the same as that of the reference axis and the direction of the length was in the same plane as and perpendicular to that of the reference axis. Then, a specimen was prepared by stacking these ribbons to a thickness of about 0.5 mm with their reference axes parallel to one another. This specimen was attached to the fiber sample mount in such a way that X-rays parallel to the reference axis were incident upon a surface perpendicular to the reference axis, and its X-ray diffraction spectrum was recorded in the same manner as in (1). The maximum value ($I_{max}$) and minimum value ($I_{min}$) of crystal peak intensity on the Debye-Scherrer ring were obtained and the ratio (R) was calculated from these values according to the following equation:

$$R = (I_{min}/I_{max}) \times 100$$

The polarizing film of the present invention must have a uniaxial orientation coefficient (f) of not less than 0.7 and preferably not less than 0.8. If the uniaxial orientation coefficient (f) is less than 0.7, the base resin will not be sufficiently oriented in one direction and the film will fail to give a satisfactorily high degree of polarization. At the same time, it is essential that the value for $f \times R$ not be less than 10. If the value for $f \times R$ is less than 10, the crystals will exhibit a uniaxial planar orientation and even through the value for f is 0.7 or greater, the film will fail to give a satisfactorily high degree of polarization. The value for $f \times R$ should preferably be not less than 15 and more preferably not less than 20.

The polarizing film of the present invention has excellent polarizing properties. Moreover, where the base resin comprises a hydrophobic resin, the polarizing film of the present invention does not show any reduction in performance even in a high-temperature and high-humidity environment and, therefore, can be utilized in liquid-crystal display devices for outdoor or automotive use.

The present invention is further illustrated by the following examples:

In these examples, the light transmission and the degree of polarization were determined according to the following procedures:

Using a double beam spectrophotometer (Model 200-10; manufactured by Hitachi, Ltd.), the light transmittance ($T_1$) of a polarizing film was measured. Then, light transmittance at the maximum absorption wavelength was measured for two pieces of the polarizing film oriented in such a way that their directions of orientation were parallel to each other ($T_2$) or their directions of orientation were perpendicular to each other ($T_3$). Thereafter, the degree of polarization (V) of this polarizing film was calculated according to the following equation:

$$V = \sqrt{\frac{T_2 - T_3}{T_2 + T_3}} \times 100(\%)$$

EXAMPLE 1

One kilogram of pellets of a polyethylene terephthalate resin (with an intrinsic viscosity of 0.67) was intimately blended with 2 g of a photodichroic anthraquinone-derived disperse dye (Miketon Polyester Blue TGSF: manufactured by Mitsui Toatsu Chemicals, Inc.) having a maximum absorption wavelength ($\lambda_{max}$) of 640 nm. Using an extruder of 40 mm diameter, the resulting blend was extruded at 280° C. to form unoriented films (300 mm wide) varying in thickness.

A film (90 μm thick) so formed was cut into a piece 20 mm wide and 50 mm long. Using a tensile tester (Tensilon; manufactured by Toyo-Baldwin Co.), this piece was longitudinally stretched at 77° C. by a ratio of 3.5 and then thermally fixed with an infrared heater. From the resulting stretched film, a portion (about 50 μm thick) located approximately in the center thereof was taken as a polarizing film. Its values for f and f×R, and optical properties at the maximum absorption wavelength were as shown in Table 1.

Example 2

Using a longitudinal roll stretching machine, an unoriented film (110 μm thick) formed in Example 1 was stretched at a roll surface temperature of 75° C. by a ratio of 4.5 and then thermally fixed over a heat roll of 180° C. The resulting stretched film was about 200 mm wide and about 50 μm thick. From this stretched film, a portion located 30 mm inside from one lateral side was taken as a polarizing film. Its values for f and f×R, and optical properties at the maximum absorption wavelength were as shown in Table 1.

EXAMPLE 3

Using a transverse stretching machine of the tenter type, an unoriented film (110 μm thick and 1 m long) formed in Example 1 was stretched at an oven temperature of 75° C. by a ratio of 5.0 and then thermally fixed at 180° C. for 1 minute. From the resulting stretched film (about 50 μm thick), a portion located 50 mm inside from the front end (bowed edge) and equidistant from both lateral ends was taken as a polarizing film. Its values for f and f×R, and otpical properties at the maximum absorption wavelength were as shown in Table 1.

COMPARATIVE EXAMPLE 1

From the stretched film obtained in Example 2, a portion located almost equidistant from both lateral ends was taken as a polarizing film. Its values for f and f×R, and optical properties at the maximum absorption wavelength were as shown in Table 1.

COMPARATIVE EXAMPLE 2

From the stretched film obtained in Example 3, a portion located 40 cm inside from the front end and equidistant from both lateral ends (i.e., located substantially in the center of the stretched film) was taken as a polarizing film. Its values for f and f×R, and optical properties at the maximum absorption wavelength were as shown in Table 1.

EXAMPLE 4

An unoriented film (100 μm thick) formed in Example 1 was imprinted with a longitudinal ink mark 100 mm long so as to be equidistant from both lateral ends. A tentering machine was constructed by modifying a simultaneous biaxial stretching machine having clips of the pantograph type so that, in the stretching section, the film speed was gradually reduced at a constant rate as the film traveled in the machine direction. The above unoriented film was fed to this tentering machine, stretched transversely in such a way that the spacing between clips increased from 200 mm at the entrance to 900 mm at the exit (i.e., by a stretch ratio of 4.5), and then thermally fixed to obtain a polyester polarizing film (about 40 μm thick). The temperatures of the preheating section, stretching section and heat-treating section of the tentering machine were 90° C., 80° C. and 180° C., respectively, and the film speed at the exit was 5 m/min.

In the polarizing film thus obtained, the mark had a length of 55 mm (with a shrink ratio of 45%). Its values for f and f×R, and its optical properties at the maximum absorption wavelength were as shown in Table 1, and no defect in appearance was noted.

EXAMPLE 5

An unoriented film (100 μm thick and 300 mm wide) formed in Example 1 was fed to a longitudinal roll stretching machine including a curved heating roll. In this longitudinal roll stretching machine, the film was fed by means of delivery rolls, passed over three curved heating rolls (with a maximum diameter of 400 mm) having a degree of curvature of 0.87 and heated to 70° C. each, stretched longidudinally at a ratio of 4 by means of stretching rolls (20 m/min), and then heat-treated under tension with thermal fixing rolls (190° C.). The curved heating roll included in this machine made it possible to stretch the film longitudinally while preventing it from being significantly stretched in the transverse direction.

The resulting stretched film was about 45 μm thick and 180 mm wide. Its values for f and f×R, and optical properties at the maximum absorption wavelength were as shown in Table 1. Little variation of optical properties in the direction of the width was noted.

The degree of curvature of the curved heating roll was defined as the ratio of the apparent width of the film passing over it to the actual width thereof.

TABLE 1

|  | Stretching conditions | | X-ray diffraction characteristics | | Optical Properties (%) | |
| --- | --- | --- | --- | --- | --- | --- |
|  | Temperature (°C.) | Stretch ratio | f | f × R | Transmittance | Degree of polarization |
| Example 1 | 77 | 3.5 | 0.75 | 15 | 34 | 81 |
| Example 2 | 75 | 4.5 | 0.90 | 45 | 33 | 85 |
| Example 3 | 75 | 5.0 | 0.91 | 53 | 34 | 88 |
| Comparative Example 1 | 75 | 4.5 | 0.65 | 20 | 38 | 65 |

TABLE 1-continued

| | Stretching conditions | | X-ray diffraction characteristics | | Optical Properties (%) | |
|---|---|---|---|---|---|---|
| | Temperature (°C.) | Stretch ratio | f | f × R | Transmittance | Degree of polarization |
| Comparative Example 2 | 75 | 5.0 | 0.76 | 8 | 38 | 58 |
| Example 4 | 80 | 4.5 | 0.92 | 48 | 42 | 87 |
| Example 5 | 70 | 4.0 | 0.89 | 41 | 40 | 89 |

What is claimed is:

1. A polarizing film containing a base resin and a photodichroic material which is characterized in that
   (1) the uniaxial orientation coefficient (f) of the principal crystal axis of the base resin with respect to the reference axis is not less than 0.7, the reference axis being defined, when the impinging X-rays are perpendicular to the surface on the polarizing film, as an axis which is in the plane of the polarizing film and which makes an angle of 90° with the axis made by normal projection of the direction of the strongest X-rays in the Debye-Scherrer ring diffracted by crystal planes parallel to the principal crystal axis of the base resin on the polarizing film; and
   (2) When a specimen of the polarizing film is cut out so as to have a surface perpendicular to the reference axis and X-rays impinging on the specimen parallel to the reference axis, the product (f×R) of the aforesaid uniaxial orientation coefficient (f) and the ratio ($R = (I_{min}/I_{max}) \times 100$) of the minimum value ($I_{min}$) to the maximum value ($I_{max}$) of diffracted X-ray intensity on the resulting Debye Scherrer ring is not less than 10.

2. A polarizing film as claimed in claim 1 wherein the base resin is a hydrophobic resin.

3. A polarizing film as claimed in claim 2 wherein the base resin is a polyolefin resin, a polyester resin or a polyamide resin.

4. A polarizing film as claimed in claim 1 wherein the photodichroic material is a photodichroic organic coloring material.

* * * * *